United States Patent
Ito

(10) Patent No.: US 7,420,598 B1
(45) Date of Patent: Sep. 2, 2008

(54) APPARATUS AND METHOD FOR RECORDING IMAGE DATA AND REPRODUCING ZOOMED IMAGES FROM THE IMAGE DATA

(75) Inventor: Kenji Ito, Asaka (JP)

(73) Assignee: Fujifilm Corporation, Tokyo (JP)

( * ) Notice: Subject to any disclaimer, the term of this patent is extended or adjusted under 35 U.S.C. 154(b) by 627 days.

(21) Appl. No.: 09/644,902

(22) Filed: Aug. 24, 2000

(30) Foreign Application Priority Data

Aug. 24, 1999 (JP) ................................. 11-236241

(51) Int. Cl.
*H04N 5/262* (2006.01)
(52) U.S. Cl. .................................................. 348/240.2
(58) Field of Classification Search .............. 348/208.6, 348/240.99, 240.1, 240.2, 333.01, 333.12, 348/441, 231.99, 231.1, 231.2, 231.3, 231.4, 348/231.5, 231.6
See application file for complete search history.

(56) References Cited

U.S. PATENT DOCUMENTS

| | | | | |
|---|---|---|---|---|
| 5,241,659 A * | 8/1993 | Parulski et al. | ............. | 345/589 |
| 5,402,171 A * | 3/1995 | Tagami et al. | ............. | 348/219.1 |
| 5,557,358 A * | 9/1996 | Mukai et al. | ............. | 396/296 |
| 5,808,678 A * | 9/1998 | Sakaegi | ............. | 348/333.03 |
| 5,862,297 A * | 1/1999 | Timmermans | ............. | 386/70 |
| 6,072,586 A * | 6/2000 | Bhargava et al. | ............. | 358/1.15 |
| 6,201,571 B1 * | 3/2001 | Ota | ............. | 348/239 |
| 6,273,535 B1 * | 8/2001 | Inoue et al. | ............. | 347/3 |
| 6,342,900 B1 * | 1/2002 | Ejima et al. | ............. | 345/698 |
| 6,487,366 B1 * | 11/2002 | Morimoto et al. | ............. | 386/117 |
| 6,522,360 B1 * | 2/2003 | Miyawaki et al. | ............. | 348/347 |
| 6,573,927 B2 * | 6/2003 | Parulski et al. | ............. | 348/32 |
| 6,580,457 B1 * | 6/2003 | Armstrong et al. | ............. | 348/317 |
| 6,606,117 B1 * | 8/2003 | Windle | ............. | 348/239 |
| 6,650,368 B1 * | 11/2003 | Doron | ............. | 348/240.2 |
| 6,657,658 B2 * | 12/2003 | Takemura | ............. | 348/207.99 |
| 2002/0093578 A1 * | 7/2002 | Kowno et al. | ............. | 348/241 |
| 2002/0158983 A1 * | 10/2002 | Fellegara et al. | ............. | 348/333.11 |

FOREIGN PATENT DOCUMENTS

JP 11-55611 6/1989

* cited by examiner

*Primary Examiner*—Justin P Misleh
(74) *Attorney, Agent, or Firm*—Birch, Stewart, Kolasch & Birch, LLP

(57) ABSTRACT

The sizes of images obtained by electronic zoom processing are rendered constant to a certain degree. To accomplish this, an image within a zoom area is enlarged or reduced to the size of a super-extended graphics array (SXGA), and the resulting image data is recorded on a memory card, if the zoom area has a size near that of the SXGA. The image within the zoom area is recorded on the memory card upon being enlarged or reduced to the size of a super VGA (SVGA) if the zoom area has a size near that of the SVGA. The image within the zoom area is recorded on the memory card upon being enlarged or reduced to the size of a VGA if the zoom area has a size near that of the VGA. Thus, when images represented by image data recorded on the memory card are zoomed, the sizes of the zoomed images are limited.

3 Claims, 9 Drawing Sheets

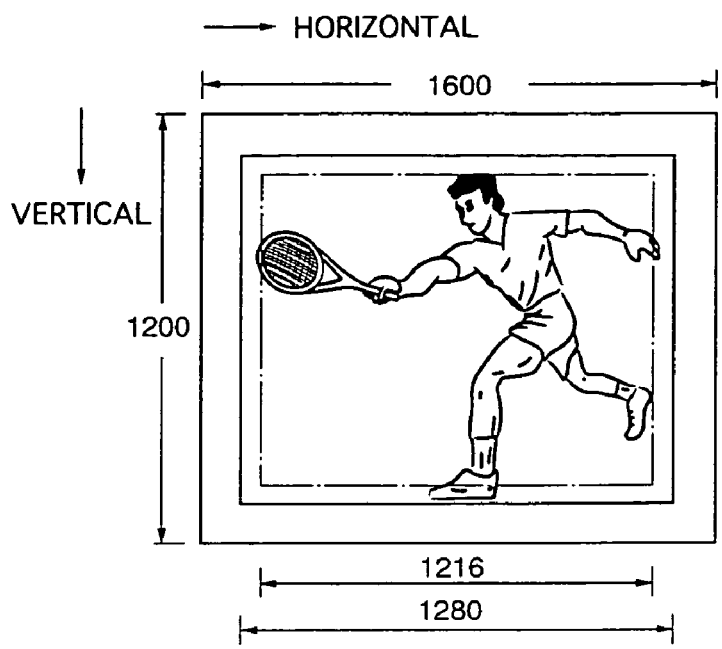
*Fig. 2*
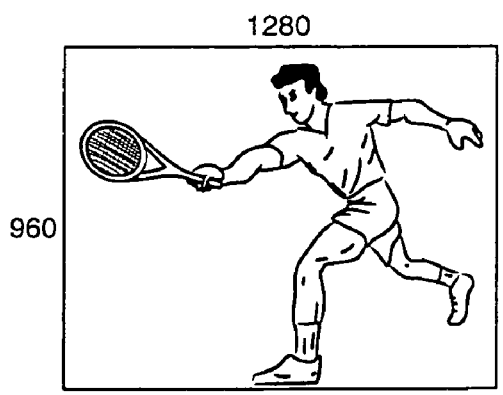
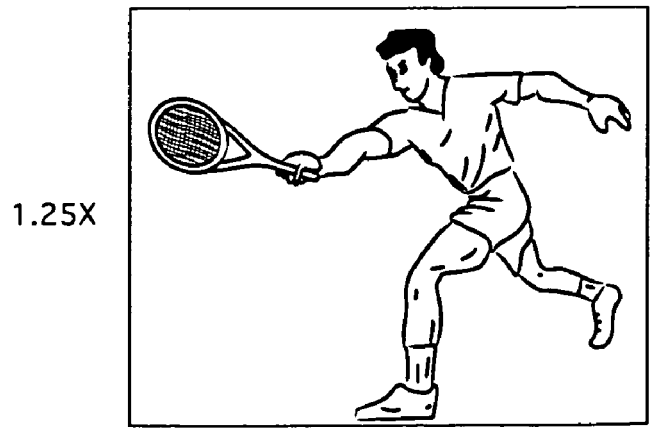

APPARATUS AND METHOD FOR RECORDING IMAGE DATA AND REPRODUCING ZOOMED IMAGES FROM THE IMAGE DATA

BACKGROUND OF THE INVENTION

1. Field of the Invention

This invention relates to an apparatus and method for recording image data on a recording medium, and to a zoomed-image reproducing apparatus and method for outputting a zoomed image.

2. Description of the Related Art

A digital camera senses the image of a subject using a solid-state electronic image sensing device such as a CCD. Digital cameras of this type having an electronic zoom capability also have come into widespread use. In a camera of this kind, applying a zoom command causes the zoom area of the image of the subject to be enlarged by pixel interpolation.

Since the image of a subject is enlarged by interpolation of pixels in the electronic zoom operation, the greater the degree of enlargement by electronic zooming, the smaller the number of pixels in the image obtained by imaging.

If image data that has undergone electronic zoom processing is recorded on a recording medium, the number of pixels in the image represented by this image data differs depending upon the magnification of electronic zooming.

When such image data is read from the recording medium and applied directly to a printer in order to be printed, images having various sizes conforming to the substantial number of pixels in each image are printed as is unless the printer itself has an enlargement/reduction processing function. As a consequence, there are instances where wasteful blank areas are left on the printing paper or where an image cannot fit on the printing paper.

In addition, if only image data that has undergone zoom processing is recorded on a recording medium, the part of the original image in the area outside the zoom area cannot be seen when the image is reproduced.

DISCLOSURE OF THE INVENTION

An object of the present invention is to fix, to some degree, the size of an image represented by image data that has been recorded by electronic zoom processing.

Another object of the present invention is to arrange it so that not only the zoomed image but also the original image in the vicinity of the zoomed area can be seen at the time of reproduction.

According to a first aspect of the present invention, the foregoing objects are attained by providing an apparatus for recording zoomed-image data, comprising: a first display controller (first display control means) for controlling a first display unit so as to display an original image represented by image data; a zoom area designation unit (zoom area designation means) for designating a zoom area within the original image; an electronic zoom processing unit (electronic zoom processing means) for applying electronic zoom processing to image data representing an image within the zoom area designated by the zoom area designation unit; a second display controller (second display control means) for controlling a second display unit so as to display a zoomed image represented by zoomed-image data to which electronic zoom processing has been applied by the electronic zoom processing unit; a size determination unit (size determination means) for determining to which of a plurality of different sizes the size of the zoom area is closest; an enlargement/reduction unit (enlargement/reduction means) for enlarging or reducing the image within the zoom area in such a manner that the size thereof becomes the size determined by the size determination unit; and a recording control unit (recording control means) for recording, on a recording medium, the image data representing the image that has undergone enlargement or reduction processing by the enlargement/reduction unit.

According to the first aspect of the present invention, there is provided also a method suited to the apparatus described above. Specifically, there is provided a method of recording image data comprising the steps of: displaying an original image represented by image data; designating a zoom area within the original image; applying electronic zoom processing to image data representing an image within the zoom area designated; displaying a zoomed image represented by zoomed-image data to which electronic zoom processing has been applied; determining to which of a plurality of different sizes the size of the zoom area is closest; enlarging or reducing the image within the zoom area in such a manner that the size thereof becomes the size determined; and recording, on a recording medium, the image data representing the image that has undergone enlargement or reduction processing.

In accordance with the first aspect of the present invention, the original image is displayed on the first display unit. A zoom area within the original image is designated (e.g., pressing a zoom button causes the image to be zoomed and the very act of pressing the zoom button designates the zoom area) and the image within the designated zoom area is subjected to electronic zoom processing. The zoomed image that has undergone this electronic zoom processing is displayed on the second display unit (the first and second display units may be the same or may be different units).

It is determined to which of a plurality of sizes the size of the zoom area is closest, and the image within the zoom area is enlarged or reduced so as to take on the size determined to be closest. Image data representing the enlarged or reduced image is recorded on a recording medium.

Image data representing an image having any one of the plurality of sizes is thus recorded on the recording medium. As a result, image data representing images having a large number of different sizes in dependence upon the zoom magnification (zoom area) can be prevented from being recorded on the recording medium.

When the image is reproduced (i.e., when the zoomed image is displayed or printed out), an image having one of the plurality of sizes is reproduced without the application of enlargement or reduction.

According to a second aspect of the present invention, the foregoing objects are attained by providing an apparatus for reproducing a zoomed image, in which original-image data and zoom command data for zooming an original image represented by the original-image data have been recorded on a recording medium in association with each other, the apparatus comprising: a data reading unit (data reading means) for reading the original-image data and zoom command data recorded on the recording medium; an electronic zoom processing unit (electronic zoom processing means) for subjecting the original-image data to electronic zoom processing based upon the zoom command that has been read by the data reading unit; and an output controller (output control means) for controlling an image output unit so as to output a zoom image represented by the image data that has been subjected to electronic zoom processing by the electronic zoom processing unit.

According to the second aspect of the present invention, there is provided also a method suited to the apparatus described above. Specifically, there is provided a method of reproducing a zoomed image, in which original-image data and zoom command data (e.g., data indicating that electronic zoom processing has been executed) for zooming an original image represented by the original-image data have been recorded on a recording medium in association with each other, the method comprising the steps of: reading the original-image data and zoom command data recorded on the recording medium; subjecting the original-image data to electronic zoom processing based upon the zoom command that has been read; and outputting a zoom image represented by the original-image data that has been subjected to electronic zoom processing.

In accordance with the second aspect of the present invention, the original-image data and zoom-command data for zooming the original image represented by the image data have been recorded on a recording medium in association with each other.

The original-image data is subjected to electronic zoom processing based upon the zoom command data, and the zoomed image that has undergone electronic zoom processing is output (displayed, printed, etc.). A zoomed image identical with the zoomed image obtained when the image data was recorded on the recording medium can be reproduced.

Image data representing an original image inclusive of the area of a zoomed image also is recorded on the recording medium and not zoomed-image data representing the zoomed image. It also possible to display an image which is in the vicinity of the zoomed image within the original image.

Zoom data representing at least one of data representing zoom magnification and data representing zoom position may be recorded on the recording medium. In such case the zoom data would be read and the image data would be subjected to at least one of electronic zoom processing at a zoom magnification in accordance with the read zoom data and electronic zoom processing applied to an area specified by the zoom position.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2 to 4 illustrate the relationship between an original image and a zoomed image;

DESCRIPTION OF THE PREFERRED EMBODIMENTS

Preferred embodiments of the present invention will now be described with reference to the drawings.

Figure 1:
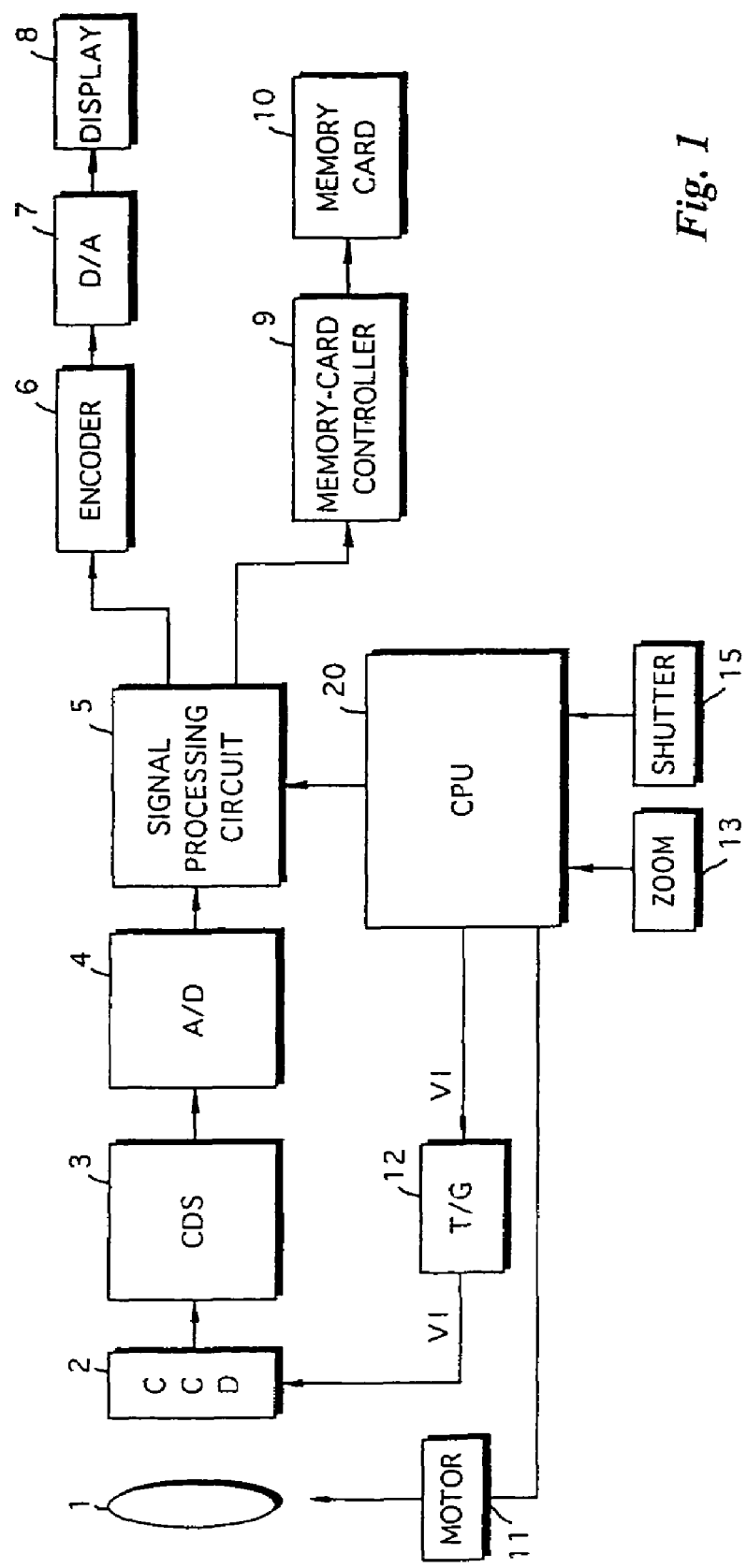
FIG. 1 is a block diagram illustrating the electrical construction of a digital still camera according to a preferred embodiment of the present invention.

FIG. 1 is a block diagram illustrating the electrical construction of a digital still camera according to this embodiment of the present invention.

The digital still camera has its overall operation controlled by a CPU 20.

The digital still camera has an electronic zoom function and is provided with a zoom switch 13 for applying an electronic zoom command, zoom position and enlargement ratio. An output signal from the zoom switch 13 is input to the CPU 20.

The digital still camera is provided with a shutter-release button 15 from which a signal indicating that the button has been pressed is also input to the CPU 20.

A motor 11 is controlled by the CPU 20. A lens 1 is adjusted by the motor 11 in such a manner that a light image representing the image of a subject is formed on the photoreceptor surface of a CCD 2.

The CCD 2 is controlled by an imaging synchronization signal VI and other control signals output from a timing generator (TG) 12. The image of a subject is sensed at a fixed period (1/60 of a second) in sync with the imaging synchronization signal VI and a video signal representing the image is output from the CCD 2. The video signal from the CCD 2 is converted to digital image data by an analog/digital conversion circuit 4. The digital image data is input to a signal processing circuit 5.

The digital image data is subjected to a gamma correction and white balance adjustment in the signal processing circuit 5. The latter has a function for performing electronic zoom processing (pixel interpolation processing) and a function for enlarging and reducing images. The image data output from the signal processing circuit 5 enters an encoder 6, which proceeds to subject the image data to predetermined encoding processing.

The digital image data is converted to an analog video signal in a digital/analog conversion circuit 7. The analog video signal resulting from the conversion is applied to a display unit 8, whereby the image of the subject is displayed in the form of a movie.

If the shutter-release button 15 is pressed, image data output from the signal processing circuit 5 enters the memory-card controller 9, whereby image data is recorded on a memory card 10.

Figure 3:
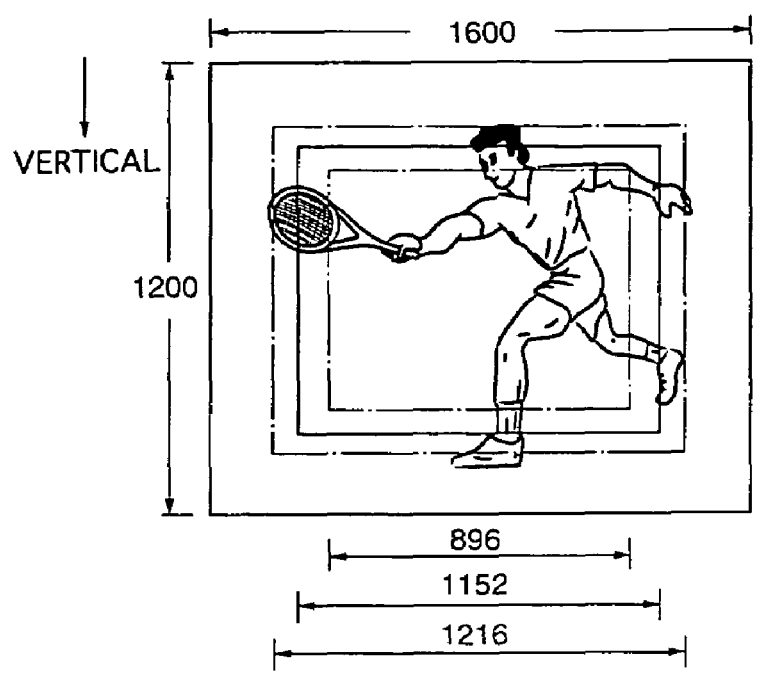
Figure 3:
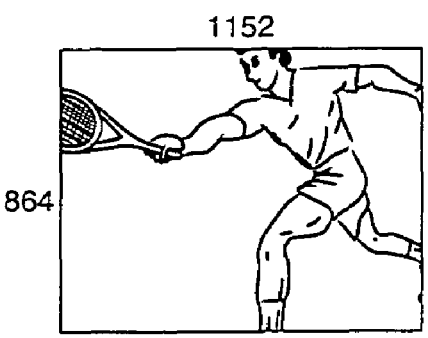
Figure 3:
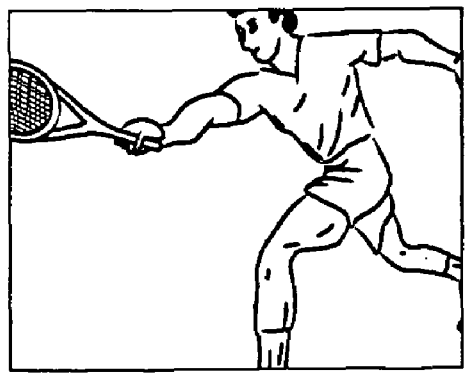
Figure 4:
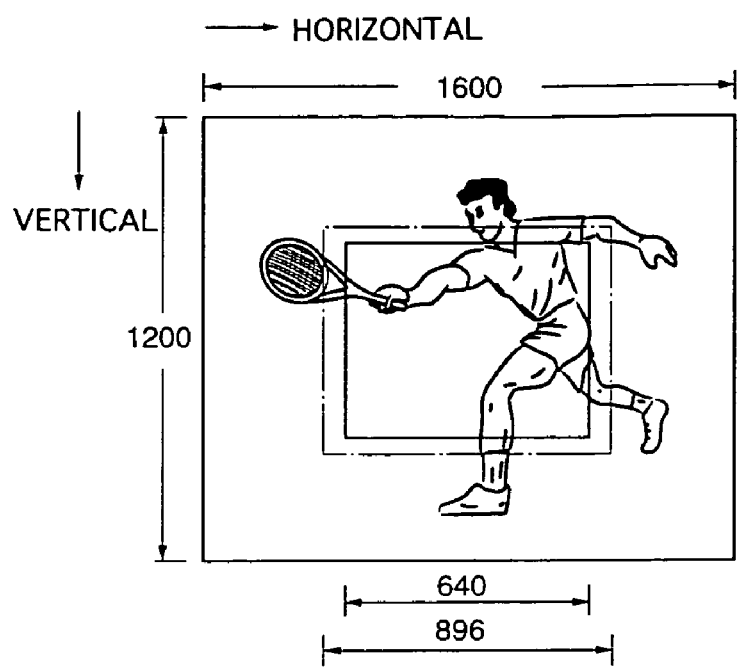
Figure 4:
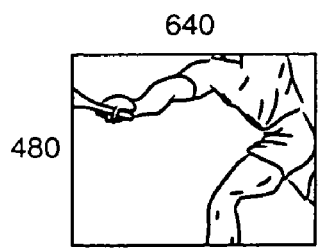
Figure 4:
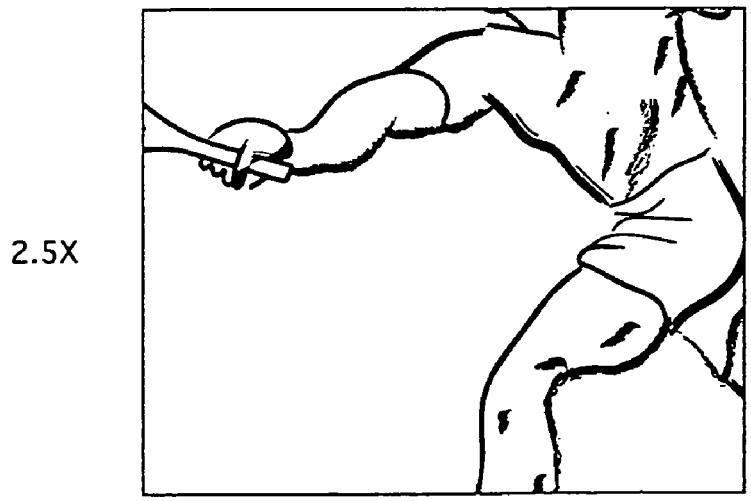

FIGS. 2 to 4 illustrate examples of images of a subject.

The image of the subject at the top of each of these figures is an image (1600 pixels horizontally and 1200 pixels vertically, which shall be referred to as the "original image") obtained by imaging the subject using the CCD 2. The image in the center of each of these figures indicates an image within a zoom area that has been set by the user through operation of the zoom switch 13. The image of the subject at the bottom of each of these figures indicates a zoomed image that is the result of electronic zoom processing (the zoom magnification is indicated at the left of the image).

In the digital still camera according to this embodiment, four sizes have been specified for sizes (numbers of pixels) of images represented by image data recorded on the memory card 10. These four sizes are: 1600 pixels horizontally and 1200 pixels vertically, which are the numbers of pixels capable of being imaged by the CCD 2; 1280 pixels horizontally and 960 pixels vertically, which are the numbers of pixels of an SXGA (super-extended graphics array); 1152 pixels horizontally and 864 pixels vertically, which are the numbers of pixels of an SVGA (super VGA); and 640 pixels horizontally and 480 pixels vertically, which are the numbers of pixels of a VGA (video graphics array).

FIG. 2 illustrates a case in which image data composed of 1280 pixels horizontally and 960 pixels vertically, which are the numbers of pixels of an SXGA, is recorded.

If the user sets an area larger than 1216 pixels horizontally as the zoom area in the figure at the top of FIG. 2, then the signal processing circuit 5 executes enlargement or reduction processing in such a manner that the image within the designated area becomes an image composed of 1280 pixels horizontally and 960 pixels vertically, as illustrated in the center of FIG. 2. Image data representing the image that has been enlarged or reduced is recorded on the memory card 10. If this image composed of 1280 pixels horizontally and 960 pixels vertically is subjected to electronic zoom processing in such a manner that the image becomes one composed of 1600 pixels horizontally and 1200 pixels vertically, which are the effective imaging limits of the CCD 2, then enlargement processing at a magnification of 1.25 is applied, as shown at the bottom of FIG. 2.

FIG. 3 illustrates a case in which image data composed of 1152 pixels horizontally and 864 pixels vertically, which are the numbers of pixels of an SVGA, is recorded.

If the user sets an area larger than 896 pixels but smaller than 1216 pixels horizontally as the zoom area in the figure at the top of FIG. 3, then enlargement or reduction processing is executed in such a manner that the image within the designated zoom area becomes an image composed of 1152 pixels horizontally and 864 pixels vertically, as illustrated in the center of FIG. 3. Image data representing the image that has been enlarged or reduced is recorded on the memory card 10. If this image composed of 1152 pixels horizontally and 864 pixels vertically is subjected to electronic zoom processing in such a manner that the image becomes one composed of 1600 pixels horizontally and 1200 pixels vertically, which are the effective imaging limits of the CCD 2, then enlargement processing at a magnification of 1.39 is applied, as shown at the bottom of FIG. 3.

FIG. 4 illustrates a case in which image data composed of 640 pixels horizontally and 480 pixels vertically, which are the numbers of pixels of a VGA, is recorded.

If the user sets an area smaller than 896 pixels horizontally as the zoom area in the figure at the top of FIG. 4, then enlargement or reduction processing is executed in such a manner that the image within the designated zoom area becomes an image composed of 640 pixels horizontally and 480 pixels vertically, as illustrated in the center of FIG. 4. Image data representing the image that has been enlarged or reduced is recorded on the memory card 10. If this image composed of 640 pixels horizontally and 480 pixels vertically is subjected to electronic zoom processing in such a manner that the image becomes one composed of 1600 pixels horizontally and 1200 pixels vertically, which are the effective imaging limits of the CCD 2, then enlargement processing at a magnification of 2.5 is applied, as shown at the bottom of FIG. 4.

Accordingly, image data is recorded on the memory card 10 in the number of pixels of the SXGA for a zoom magnification up to 1.25×, in the number of pixels of the SVGA for a zoom magnification of 1.25 to 1.39×, and in the number of pixels of the VGA for a zoom magnification of greater than 1.39×.

Figure 5:
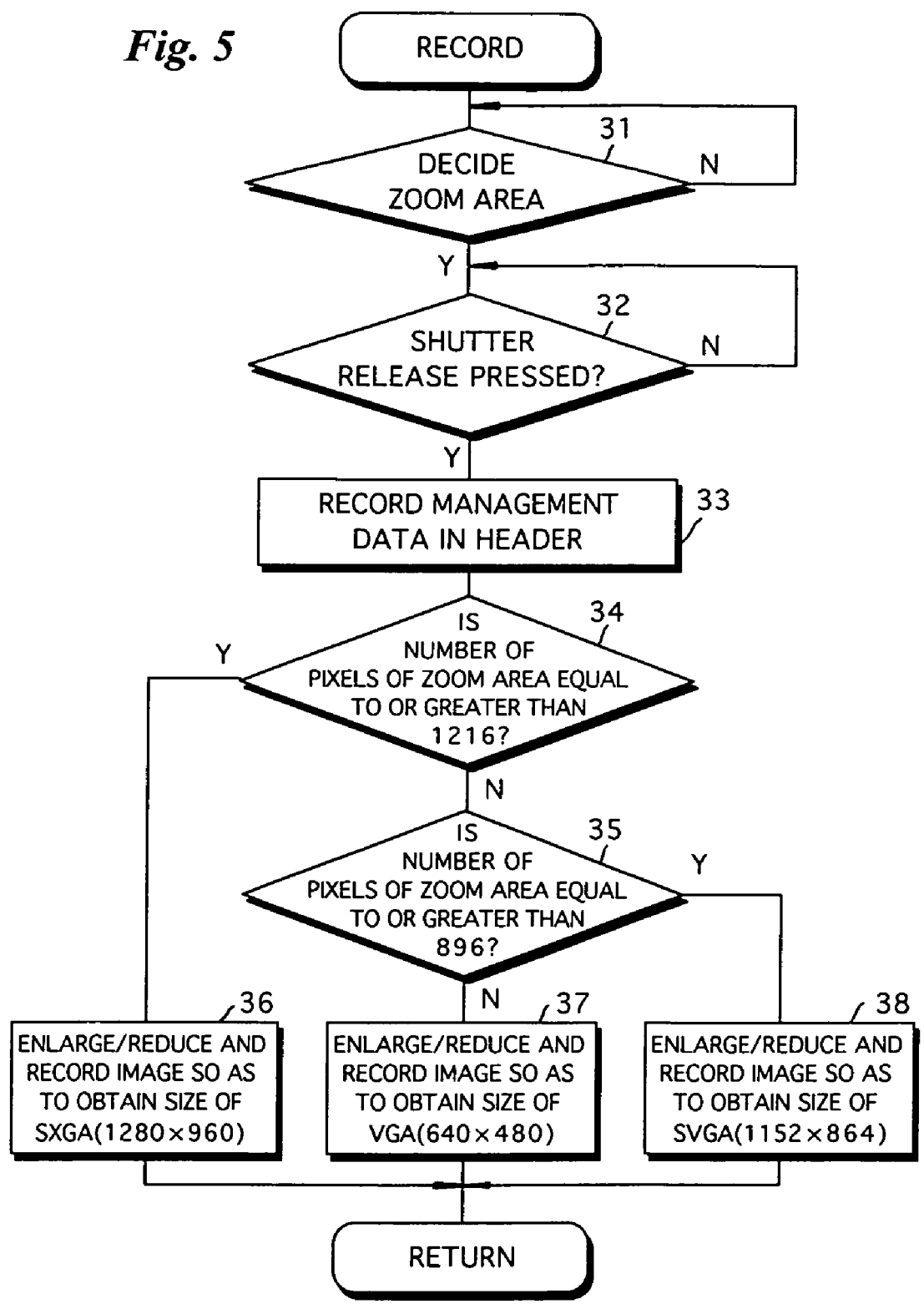
FIG. 5 is a flowchart illustrating processing executed when recording is performed by the digital still camera according to this embodiment.

FIG. 5 is a flowchart illustrating record processing executed by the digital still camera.

The image of a subject is sensed and the image is displayed on the display screen of the display unit 8 in the manner described above. If data representing a zoom command, zoom magnification and zoom area is applied by the zoom switch 13, the image data representing the image of the subject is subjected to electronic zoom processing in the signal processing circuit 5. The image enlarged by zoom processing is displayed on the display screen of the display unit 8. The zoom area is decided as a result ("YES" at step 31).

If the shutter-release button 15 is pressed by the user ("YES" at step 32), then management data (which includes data representing the date, shutter speed and thumbnail images of subject images) is recorded in a header recording area of the memory card 10 (step 33).

It is determined whether the number of pixels of the zoom area in the horizontal direction is equal to or greater than 1216 (step 34). If the number of pixels of the zoom area in the horizontal direction is equal to or greater than 1216 ("YES" at step 34), then the image within the designated zoom area is subjected to enlargement or reduction processing so as to take on the SXGA size. The image data that has undergone enlargement or reduction processing is recorded on the memory card 10 (step 36).

If the number of pixels of the zoom area in the horizontal direction is not equal to or greater than 1216 ("NO" at step 34), then it is determined whether the number of pixels of the zoom area in the horizontal direction is equal to or greater than 896 (step 35). If the number of pixels of the zoom area in the horizontal direction is equal to or greater than 896 ("YES" at step 35), then the image within the designated zoom area is subjected to enlargement or reduction processing so as to take on the SVGA size. The image data that has undergone enlargement or reduction processing is recorded on the memory card 10 (step 38).

If the number of pixels of the zoom area in the horizontal direction is less than 896 ("NO" at step 35), then the image within the designated zoom area is subjected to enlargement or reduction processing so as to take on the VGA size. The image data that has undergone enlargement or reduction processing is recorded on the memory card 10 (step 37).

Though image size is judged only in terms of the number of pixels in the horizontal direction in the above-described embodiment, the number of pixels in the vertical direction may be considered if desired.

In a case where enlargement or reduction processing is not executed at the time of reproduction, an image having the SXGA, SVGA or VGA size is obtained. This makes it possible to prevent the display or printing of images having many different sizes in dependence upon the zoom magnification. Even if printing is performed, printing paper can be used in accordance with the size of the image, thus making it possible to prevent wasteful blank spaces from being left on the printing paper.

It goes without saying that if zoom processing is not applied, image data consisting of 1600 pixels horizontally and 1200 pixels vertically, which are the numbers of pixels defining the effective imaging limits of the CCD 2, will be recorded in the image-data recording area of the memory card 10.

FIGS. 6 to 9 illustrates another embodiment of the present invention.

Figure 6:
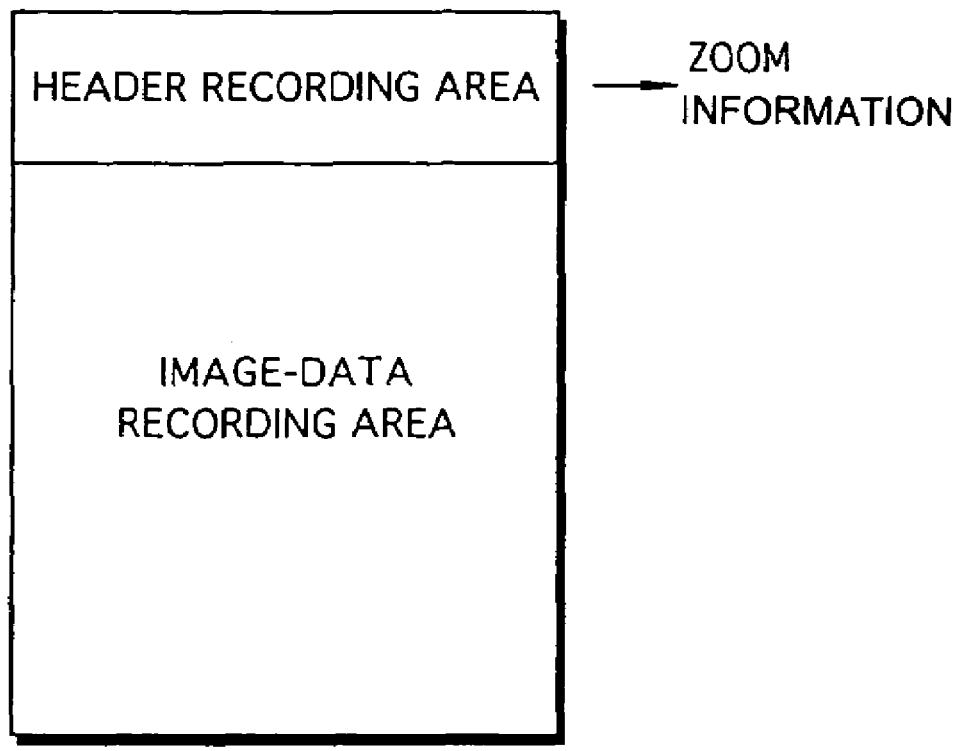
FIG. 6 illustrates the data structure of a memory card according to another embodiment of the present invention.

FIG. 6 illustrates the data structure of the memory card 10.

The memory card 10 includes a header recording area and an image-data recording area.

The header recording area records the data for managing the image data that has been recorded on the memory card 10. Zoom information (information indicating zoom magnification, zoom area and the fact that zooming has been applied) also is stored in the header recording area.

Compressed image data representing the images of subjects is recorded in the image-data recording area.

Figure 7:
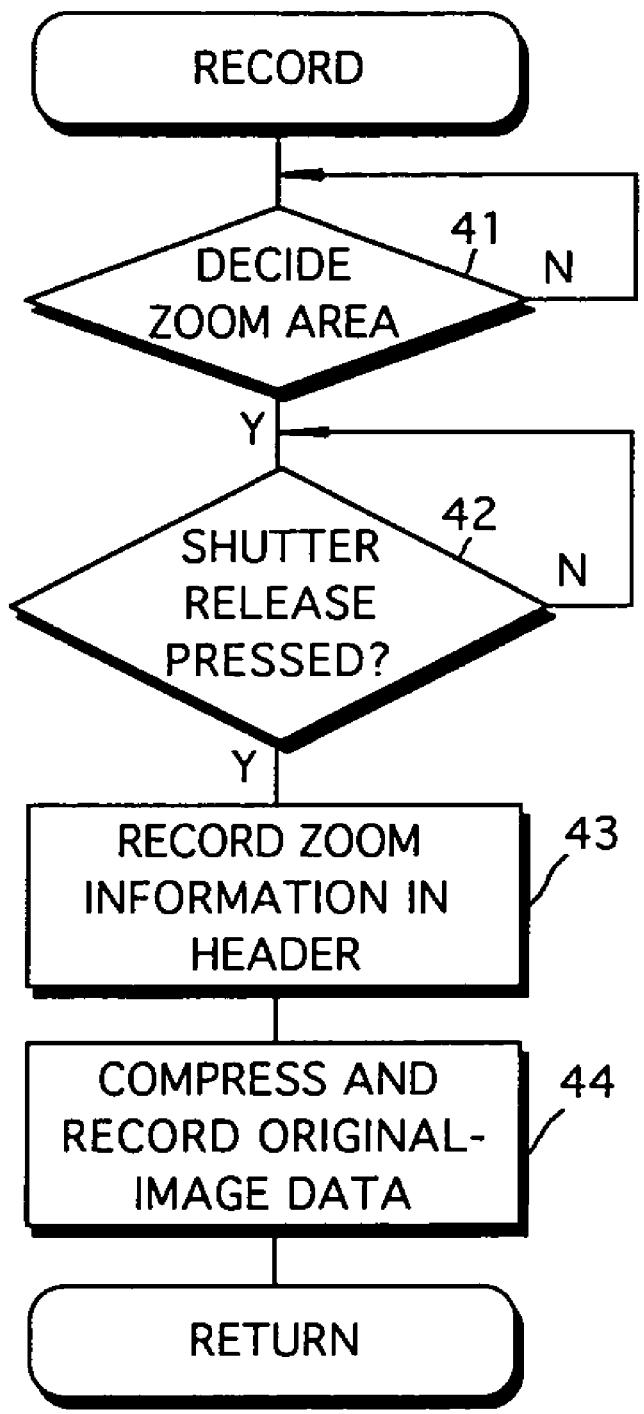
FIG. 7 is a flowchart illustrating processing executed when recording is performed by a digital still camera according to the other embodiment.
Figure 8:
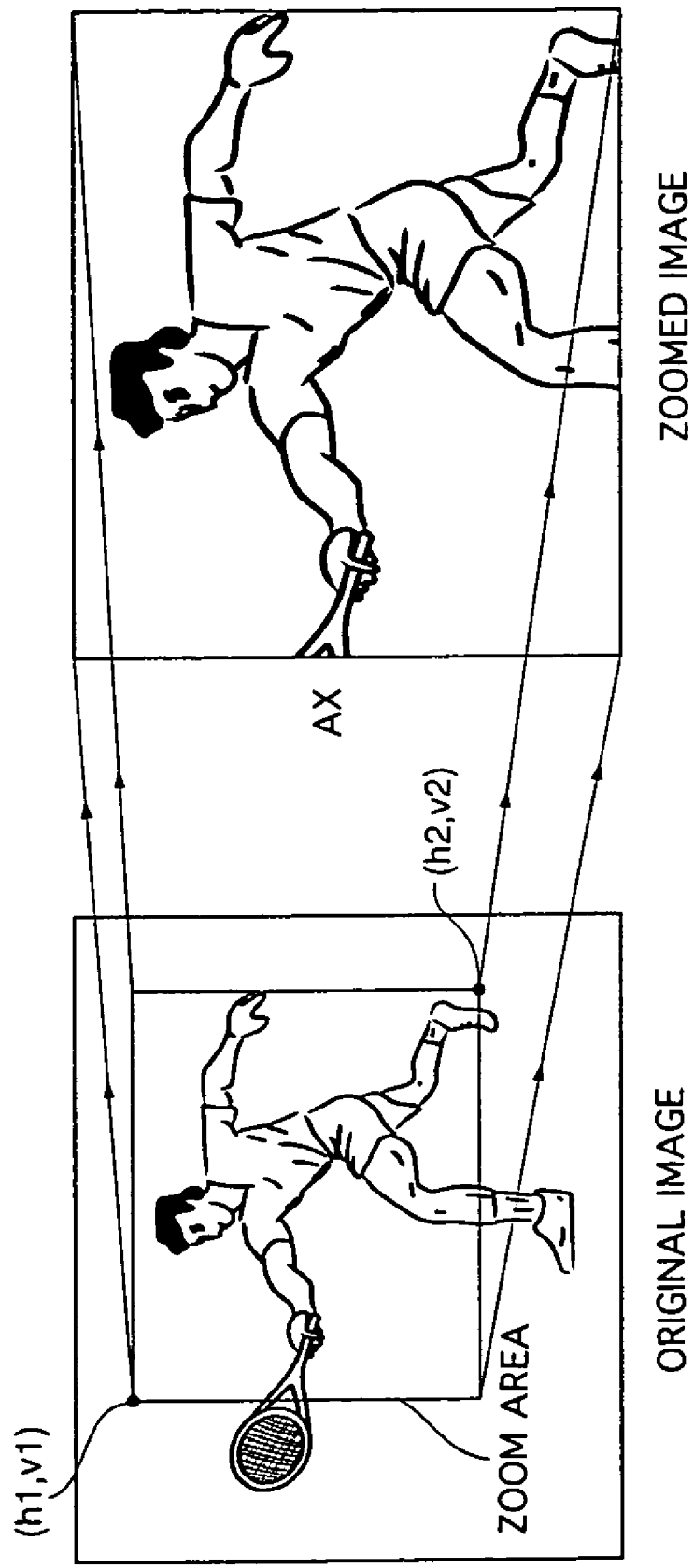
FIG. 8 illustrates the relationship between an original image and a zoomed image according to the other embodiment.

FIG. 7 is a flowchart illustrating processing executed when recording is performed by the digital still camera according to this embodiment, and FIG. 8 illustrates an original image and a zoomed image displayed on the display unit.

In a manner similar to that of the embodiment described earlier, the image of a subject is sensed and the image is displayed on the display screen of the display unit 8. The zoom area is decided by the zoom switch 13 (step 41). The subject image (zoomed image) enlarged by electronic zoom processing is displayed on the display unit 8.

If the shutter-release button 15 is pressed by the user ("YES" at step 42), then image data representing the subject image (the original image) prior to application of electronic zoom processing output from the CCD 2 is stored temporarily in a memory (not shown).

Zoom information [which includes coordinates (h1,v1), (h2,v2) representing the zoom area as well as a zoom magnification A] is recorded in the header recording area of the memory card 10 (step 43). Furthermore, the original-image data that has been stored temporarily in the memory is read out and compressed. This data compression would be carried out by the signal processing circuit 5. The compressed image data is recorded in the image-data recording area of the memory card 10 (step 44).

Even if a zoom command is applied, image data representing the zoomed image is not recorded on the memory card 10; what is recorded on the memory card 10 is image data representing the original image, namely the image, prior to application of electronic zoom processing, that has been sensed by the CCD 2.

Figure 9:
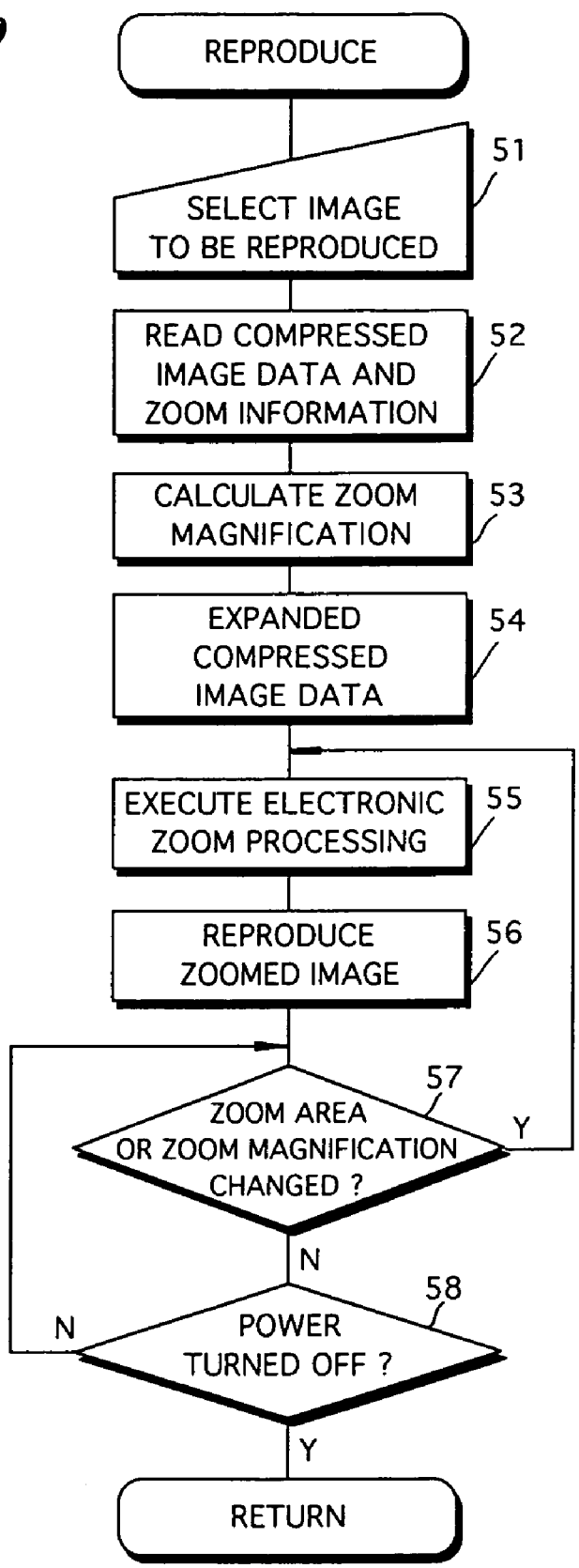
FIG. 9 is a flowchart illustrating processing executed when recording is performed by a digital still camera according to the other embodiment.

FIG. 9 is a flowchart illustrating reproduction processing executed by the digital still camera.

A desired frame is selected (step 51) by a frame-advance switch (not shown). Compressed image data representing the image of the selected frame is read out of the image-data recording area of memory card 10 and stored temporarily in the memory. Zoom information regarding the selected frame is read out of the header recording area of memory card 10 and recorded temporarily in the memory (step 52).

Zoom magnification is calculated based upon the zoom information that has been read out of the header recording area of the memory card 10 (step 53). It goes without saying that if zoom magnification itself has been recorded on the memory card 10, then processing for calculating zoom magnification is not executed. The compressed image data is read out of the memory and is then expanded (step 54). Of the image data that has been expanded, the image data in the zoom area obtained from the zoom information is subjected to electronic zoom processing by the signal processing circuit 5 at the zoom magnification calculated (step 55).

By applying the electronically zoomed image data to the display unit 8, the zoomed image is displayed on the display screen of the display unit 8 (step 56).

As mentioned earlier, image data representing original images which include the zoom area, and not image data representing zoomed images, has been recorded on the memory card. As a result, an image different from the area of the zoomed image being displayed on the display unit 8 can be displayed on the display screen of the display unit 8. If the zoom area or zoom magnification is changed by the zoom switch 13, therefore (step 57), the original-image data is subjected to electronic zoom processing again (step 55). The zoomed image is displayed on the display unit 8 as a result (step 56).

Thus, not only a zoomed image of an area and magnification that were set at the time image data was recorded but also a zoomed image of an area and magnification different from that of the first-mentioned zoomed image can be obtained.

A zoomed image in the frame of which the zoom magnification and zoom area have been changed can be displayed until the power source of the digital still camera is turned off (step 58).

As many apparently widely different embodiments of the present invention can be made without departing from the spirit and scope thereof, it is to be understood that the invention is not limited to the specific embodiments thereof except as defined in the appended claims.

What is claimed is:

1. An apparatus for recording image data, comprising:
    a first display controller for controlling a first display unit so as to display an original image represented by image data;
    a zoom area designation unit for designating a zoom area within the original image, wherein the zoom area is a user determined size;
    an electronic zoom processing unit for applying electronic zoom processing to image data representing an image within the zoom area designated by said zoom area designation unit;
    a second display controller for controlling a second display unit so as to display a zoomed image represented by zoomed-image data to which electronic zoom processing has been applied by said electronic zoom processing unit;
    a size determination unit for determining to which of a plurality of different sizes the size of the zoom area is closest;
    an enlargement/reduction unit for enlarging or reducing the image within the zoom area in such a manner that the size thereof becomes the size determined by said size determination unit; and
    a recording control unit for recording, on a recording medium, the image data representing the image that has undergone enlargement or reduction processing by said enlargement/reduction unit.

2. The apparatus according to claim 1, wherein said first display unit and said second display unit are the same.

3. A method of recording image data comprising the steps of:
    displaying an original image represented by image data;
    designating a zoom area within the original image, wherein the zoom area is a user determined size;
    applying electronic zoom processing to image data representing an image within the zoom area designated;
    displaying a zoomed image represented by zoomed-image data to which electronic zoom processing has been applied;
    determining to which of a plurality of different sizes the size of the zoom area is closest;
    enlarging or reducing the image within the zoom area in such a manner that the size thereof becomes the size determined; and
    recording, on a recording medium, the image data representing the image that has undergone enlargement or reduction processing.

* * * * *